United States Patent
Law et al.

(10) Patent No.: US 7,853,734 B2
(45) Date of Patent: Dec. 14, 2010

(54) VIDEO BUS FOR A VIDEO DECODING SYSTEM

(75) Inventors: Patrick Law, Milpitas, CA (US);
Darren Neuman, San Jose, CA (US);
David Baer, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 725 days.

(21) Appl. No.: 10/386,245

(22) Filed: Mar. 11, 2003

(65) Prior Publication Data
US 2004/0078504 A1    Apr. 22, 2004

Related U.S. Application Data

(60) Provisional application No. 60/420,347, filed on Oct. 22, 2002.

(51) Int. Cl.
*G06F 13/00* (2006.01)

(52) U.S. Cl. .............................. 710/33; 710/22; 710/52; 710/105; 710/305; 715/400

(58) Field of Classification Search ................. 710/22, 710/33, 52, 100, 105, 300, 305, 308
See application file for complete search history.

(56) References Cited

U.S. PATENT DOCUMENTS

| | | | |
|---|---|---|---|
| 5,602,878 A | 2/1997 | Cross | |
| 5,611,064 A * | 3/1997 | Maund et al. | 711/209 |
| 5,751,375 A * | 5/1998 | Ninomiya et al. | 348/571 |
| 6,434,654 B1 * | 8/2002 | Story et al. | 710/307 |
| 6,457,080 B1 * | 9/2002 | Sherman et al. | 710/305 |
| 6,483,505 B1 * | 11/2002 | Morein et al. | 345/419 |
| 6,717,989 B1 * | 4/2004 | Simsic et al. | 375/240.26 |
| 2001/0029556 A1 * | 10/2001 | Priem et al. | 710/23 |
| 2002/0178285 A1 * | 11/2002 | Donaldson et al. | 709/237 |
| 2003/0132944 A1 * | 7/2003 | Smith | 345/581 |
| 2005/0062892 A1 * | 3/2005 | Adams et al. | 348/716 |

FOREIGN PATENT DOCUMENTS

| | | | |
|---|---|---|---|
| EP | 0509140 A | 10/1992 | |
| EP | 1154644 A | 11/2001 | |

* cited by examiner

*Primary Examiner*—Eron J Sorrell
(74) *Attorney, Agent, or Firm*—McAndrews, Held & Malloy, Ltd.

(57) ABSTRACT

Systems and methods are disclosed for a bus, link or interface. More specifically, systems and methods are discloses for a bus, link or interface adapted to transmit data and control information to at least one processing module and provide synchronization between the data and the control information without requiring the transmission of blank pixels or timing information.

13 Claims, 13 Drawing Sheets

VIDEO BUS FOR A VIDEO DECODING SYSTEM

CROSS-REFERENCE TO RELATED APPLICATIONS

This application is related to, and claims benefit of and priority from, Provisional Application Ser. No. 60/420,347 dated Oct. 22, 2002, titled "Video Bus For A Video Decoding System", the complete subject matter of which is incorporated herein by reference in its entirety.

U.S. Provisional Application Ser. No. 60/420,152 filed Oct. 22, 2002, titled "A/V Decoder Having A Clocking Scheme That Is Independent Of Input Data Streams"; U.S. patent application Ser. No. 10/300,371 filed Nov. 20, 2002, titled "A/V Decoder Having A Clocking Scheme That Is Independent Of Input Data Streams"; U.S. Provisional Application Ser. No. 60/420,136 filed Oct. 22, 2002, titled "NCO Based Clock Recovery System and Method for A/V Decoder"; U.S. patent application Ser. No. 10/313,237 filed Dec. 5, 2002, titled "NCO Based Clock Recovery System and Method for A/V Decoder"; U.S. Provisional Application Ser. No. 60/420,344 filed Oct. 22, 2002, titled "Data Rate Management System and Method for A/V Decoder"; U.S. Provisional Application Ser. No. 60/420,342 filed Oct. 22, 2002, titled "A/V System and Method Supporting a Pull Data Flow Scheme"; U.S. patent application Ser. No. 10/300,234 filed Nov. 20, 2002, titled "A/V System and Method Supporting a Pull Data Flow Scheme"; U.S. Provisional Application Ser. No. 60/420,140 filed Oct. 22, 2002, titled "Hardware Assisted Format Change Mechanism in a Display Controller"; U.S. patent application Ser. No. 10/300,370 filed Nov. 20, 2002 titled "Hardware Assisted Format Change Mechanism in a Display Controller"; U.S. Provisional Application Ser. No. 60/420,151 filed Oct. 22, 2002, titled "Network Environment for Video Processing Modules"; U.S. patent application Ser. No. 10/314,525 filed Dec. 9, 2002 titled "Network Environment for Video Processing Modules"; U.S. Provisional Application Ser. No. 60/420,226 filed Oct. 22, 2002, titled "Filter Module for a Video Decoding System"; and U.S. Provisional Application Ser. No. 60/420,308 filed Oct. 22, 2002, titled "Multi-Pass System and Method Supporting Multiple Streams of Video" are each incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The present invention relates to a bus or interface. More specifically, the present invention relates to a bus or interface used in a network environment in an A/V system using "A/V decoders", where the A/V decoders are adapted to process, decode or decompress one or more input data streams (alternatively referred to as "input data", "input data streams" or "data streams").

There is currently no known methodological way to connect video processing modules particularly in A/V systems, and particularly using any predetermined protocol. Most video processing modules are connected together in an ad-hoc manner. As a result, such ad-hoc designs may become difficult to verify, maintain and reuse. Furthermore, as more features are added to the A/V systems (i.e., incorporating more video processing modules for example) it becomes more difficult to design and integrate such features properly. This may result in long development cycles, poor design reuse and an unreliable product.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

There is a need for a uniform link, bus or interface that couples various video processing modules, specifically in a network environment. An exemplary embodiment of such a uniform interface would enable the reuse of various processing modules, enable expansion and provide for quick integration of new modules into the design. Further, an exemplary uniform interface would enable the development of standardized tools (e.g., bus probes, protocol generators/checkers), enable effective simulation and verification groups, reduce the number of clock domains, ease design reuse and enable format changes in a robust manner.

Features of the present invention may be found in a bus adapted to transmit data and control information to at least one processing module. In this embodiment, the bus provides synchronization between the data and the control information without requiring the transmission of blank pixels or timing information. More specifically, the data is transmitted as a contiguous array of data, wherein the processing module uses the data and control information to process a field of data.

Another embodiment of the present invention relates to a bus adapted to transmit data and control information. This embodiment is adapted to transmit the data and control information between at least two modules in a network and act as a synchronous link there between without requiring the transmission of blank pixels or timing information.

Yet another embodiment of the present invention relates to a network adapted to process data. In this embodiment, the network comprises a register DMA controller, at least one node, at least one bus and at least one network module. The bride is adapted to support register access, while the node is adapted to process the data. The bus is adapted to transmit data and control information to at least the node and provide synchronization between the data and the control information without requiring the transmission of blank pixels or timing information. The network module communicates with at least the bus and is adapted to route the data to the bus.

Still another embodiment relates to a method of transmitting data and control information using a bus in a network. This embodiment comprises transmitting the data and control information over the bus at a first rate and receiving the data and control information at a processing module in the network, where at least the data is stored in a storage module in the processing module. The method further comprises preventing data overrun of the storage module and processing the data stored in the storage module at a second rate.

Another embodiment of the present invention relates to a method of transmitting data and control information using a bus in a network. This embodiment comprises processing the data in a first video processing module at a first rate and transmitting the data and the control information over the bus at a second rate. The data and control information is received in a second video processing module and at least the data is stored in a storage module in the second video processing module. The data stored in the storage module is retrieved at a third rate. The method determines if a retrieval rate of the data is less than a storage rate of the data and processes the data.

These and other advantages and novel features of the present invention, as well as details of an illustrated embodiment thereof, will be more fully understood from the following description and drawings.

DETAILED DESCRIPTION OF THE INVENTION

The following description is made with reference to the appended figures.

Figure 1:
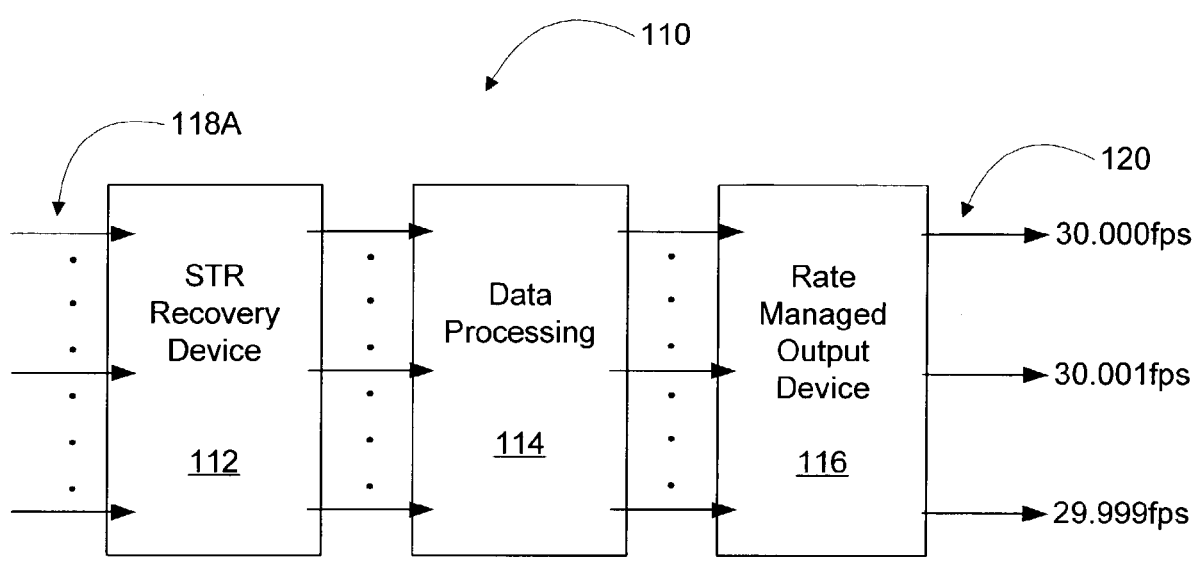
FIG. 1 illustrates one embodiment of a block diagram of an A/V decoder in accordance with the present invention.
Figure 2:
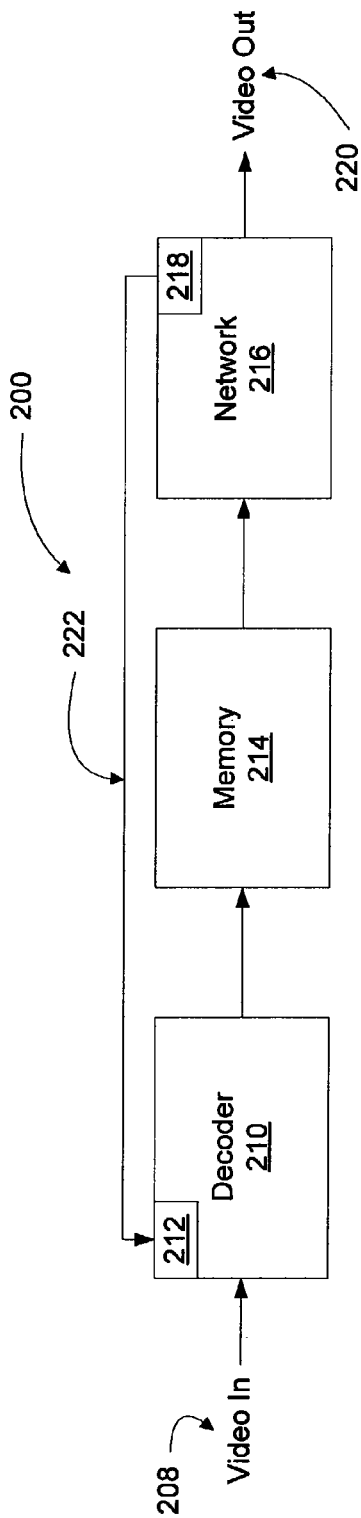
FIG. 2 illustrates one embodiment of a block diagram of an A/V system having a network in accordance with the present invention.

One embodiment of the present invention relates to a link, bus or interface. More specifically, one embodiment relates to link, bus or interface used in a network environment in an A/V decoder system that decodes one or more input data streams with multiple output rates using a single clock reference. FIGS. 1 and 2 illustrate block diagrams of embodiments of A/V systems in accordance with the present invention.

FIG. 1 illustrates one embodiment of a high level block diagram of embodiment of an A/V decoder, generally designated 110. More detail about the A/V decoder is provided in U.S. Provisional Application Ser. No. 60/420,152 filed Oct. 22, 2002, titled "A/V Decoder Having A Clocking Scheme That Is Independent Of Input Data Streams" and U.S. patent application Ser. No. 10/300,371 filed Nov. 20, 2002, titled "A/V Decoder Having A Clocking Scheme That Is Independent Of Input Data Streams", the complete subject matter of each of which is incorporated herein by reference in its entirety. In the illustrated embodiment, the decoder 110 comprises a system time reference recovery device 112 (alternatively referred to as an "STR recovery device") having one or more input data streams 118.

The STR recovery device 112 is illustrated communicating with an A/V data processing device 114. In one embodiment of the invention, STR refers to a reference time value. It is anticipated that different or more complex systems are also possible and within the scope of the present invention. For example if the A/V decoder 110 has more than one data source, the decoder may include more than one STR recovery device, where the number of STR recovery devices may or may not correspond to the number of data sources. More detail about the STR recovery devices is provided in U.S. Provisional Application Ser. No. 60/420,136 filed Oct. 22, 2002, titled "NCO Based Clock Recovery System and Method for A/V Decoder" and U.S. patent application Ser. No. 10/313,237 filed Dec. 5, 2002, titled "NCO Based Clock Recovery System and Method for A/V Decoder", the complete subject matter of each of which is incorporated herein by reference in its entirety.

As an alternative to the MPEG scheme, an A/V system incorporating an A/V decoder may accept analog television signals as inputs. In this embodiment, the analog video input goes through, and is processed or decoded by, the A/V data processing device 114, which may comprise a video decoder or VDEC. Likewise, analog audio goes through, and is processed or decoded by, the A/V data processing device 114 which may further comprise a BTSC audio decoder (alternatively referred to as a "ADEC" or "BTSC").

One embodiment of the present invention uses a system clock (a fixed system clock for example) to control the data processing. More specifically, the system clock may be used to control the data process in a network in accordance with the present invention. It is contemplated that the STR recovery device 112 may be locked to the analog video line rate. The analog hysncs are converted into a psuedo-STR using a simple counter in one embodiment. The STR recovery device 112 locks to this psuedo-STR and broadcasts the recovered STR to the rest of the decoder 110. The broadcast STR is used to control the output rates as provided previously.

FIG. 1 further illustrates a rate managed output device 116, which is illustrated as communicating with the data processing device 114. In the illustrated embodiment, the rate managed output device 116 has one or more A/V outputs 120, which are output at the same or different rates. In FIG. 1, three A/V outputs, generally designated 120, are illustrated. For example, one A/V output is output at 29.999 frames per second (alternatively referred to as "fps"), one is output at 30.001 fps and one is output at 30.000 fps.

In one embodiment, the A/V data processing device 114 includes a network environment for video processing modules. The data processing device 114 bases audio and video processing on multiples of a single, fixed clock, a 27 MHz crystal clock for example. It is contemplated that, as a single fixed clock is used, the processing is not constrained by clock boundaries. Video and audio may be muxed between modules. It is further contemplated that such architecture may be made orthogonal, and easy to control. More detail about the data processing devices is disclosed in the U.S. Provisional Application Ser. No. 60/420,342 filed Oct. 22, 2002, titled "A/V System and Method Supporting a Pull Data Flow Scheme" and U.S. patent application Ser. No. 10/300,234 filed Nov. 20, 2002, titled "A/V System and Method Supporting a Pull Data Flow Scheme", the complete subject matter of each of which is incorporated herein by reference.

In accordance with one embodiment, all data, including all audio and video data, is processed by a network environment and transferred using a "pull" model or mode, even though typical A/V streams (e.g., MPEG) are adapted to operate according to a push model or mode. The outputs request data as needed. Each module in the A/V decoder 110 may supply data to its outputs at the rate it is requested. Because a pull model or mode is used, the data processing clock (i.e., the system clock) is not tied to the input data rate. For example, the audio decoder may be clocked at 243 MHz, 133 MHz, or any other reasonable rate. The audio decoder clock does not need to "track" the input data rate.

Conventional A/V decoders use a VCXO or VCXO-PLL to lock the chip clock to the input data rate. However, one embodiment of the present invention uses rate managed output devices 116 and the associated SRC devices to change or adjust the video and audio output rates.

It is contemplated that, in one embodiment of the present invention, the output data rate tracks the STR. If the A/V decoder decodes multiple video streams, there may be multiple STRs. Each output data rate tracks an associated STR. The process of controlling the output rates may be called "rate management." In one embodiment, the rate managed output device 116 (alternatively referred to as a "output rate manager" or "output rate manager PLL"), comprising for example a digital PLL, is used to compare the output rate with the STR, and adjust the output rate accordingly, such that the output data rate matches the STR and the input data rate. In one embodiment the A/V decoder may include several output rate managers, one for each output of the A/V decoder. More detail about rate managers is provided in U.S. Provisional Application Ser. No. 60/420,344 filed Oct. 22, 2002, titled "Data Rate Management System and Method for A/V Decoder", the complete subject matter of which is incorporated herein by reference.

FIG. 2 illustrates one embodiment of a block diagram of an A/V system, generally designated 200, having a network in accordance with the present invention. It is contemplated that the illustrated A/V system may be similar to those A/V systems provided previously. It is also contemplated that the network may be used in different systems. In this embodiment, system 200 includes a decoder 210 (an MPEG decoder for example) adapted to receive video inputs or data 208. The decoder 210 includes one or more STR recovery devices 212, used, with a system clock (a fixed system clock for example) to control the data processing similar to that provided previously. However, other decoders, with or without STR recovery devices, are contemplated.

A memory or frame buffer 214 is illustrated coupled to the decoder 210 and receives data therefrom. The memory 214 is shown coupled to network 216 as illustrated, which is adapted to transport and process video or data, outputting video out or data 220. In one embodiment, the network 216 is adapted to support a pull data flow. The network 216 includes one or more counters 218 (coupled to the STR recovery device via feedback loop 222) that, along with the rate managed output device (not shown) control the data rate of the output.

Figure 3:
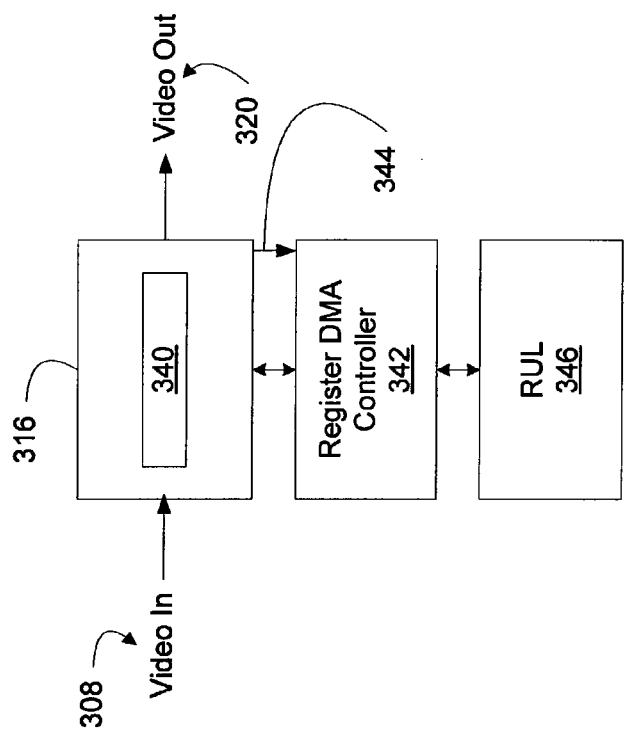
FIG. 3 illustrates another embodiment of a block diagram of an A/V system having a network in accordance with the present invention.

FIG. 3 illustrates one embodiment of a block diagram of a network, similar to the network 216 of FIG. 2 in accordance with the present invention. In this embodiment, the network 316 is adapted to receive video-in 308 (from a memory for example) and output video-out 320.

FIG. 3 further illustrates at least one display pipeline 340 inside the network 316. In one embodiment of the present invention, the display pipeline 340 is changeably formed by chaining, coupling or concatenating one or more network nodes together on the fly (i.e., in real time), depending on the network requirements. It is contemplated that the nodes may be re-configured, so that a plurality of display pipelines 340 may be formed, each pipeline having a different functionality depending on the nodes that are concatenated together. Moreover, in one embodiment, it is contemplated that the network 340 may change the display pipeline 340 every $\frac{1}{60}^{th}$ of a second for example (i.e., real time).

In this embodiment, a register DMA controller 342 (alternatively referred to as an "RDC") is illustrated coupled to the network 316 and one or more register update lists 346 (alternatively referred to as an "RUL"). The RDC 342 is adapted to support multiple, configurable pipelines 340 by accessing and fetching (i.e., obtaining) one or more instructions from the RUL 346 and providing such instructions to configure at least one display pipeline 340 from a plurality of possible display pipelines. In one embodiment, the RDC 342 accesses the RUL 346 (fetching the instructions) in response to the one or more trigger signals 344 (real time DMA trigger signals or events generated by the last node in the pipeline 340 and transmitted over a link or bus for example). It is contemplated that, if the network 316 did not have an RDC 342 associated therewith, the network 316 would have to reconfigure the pipeline one register at a time.

Figure 4:
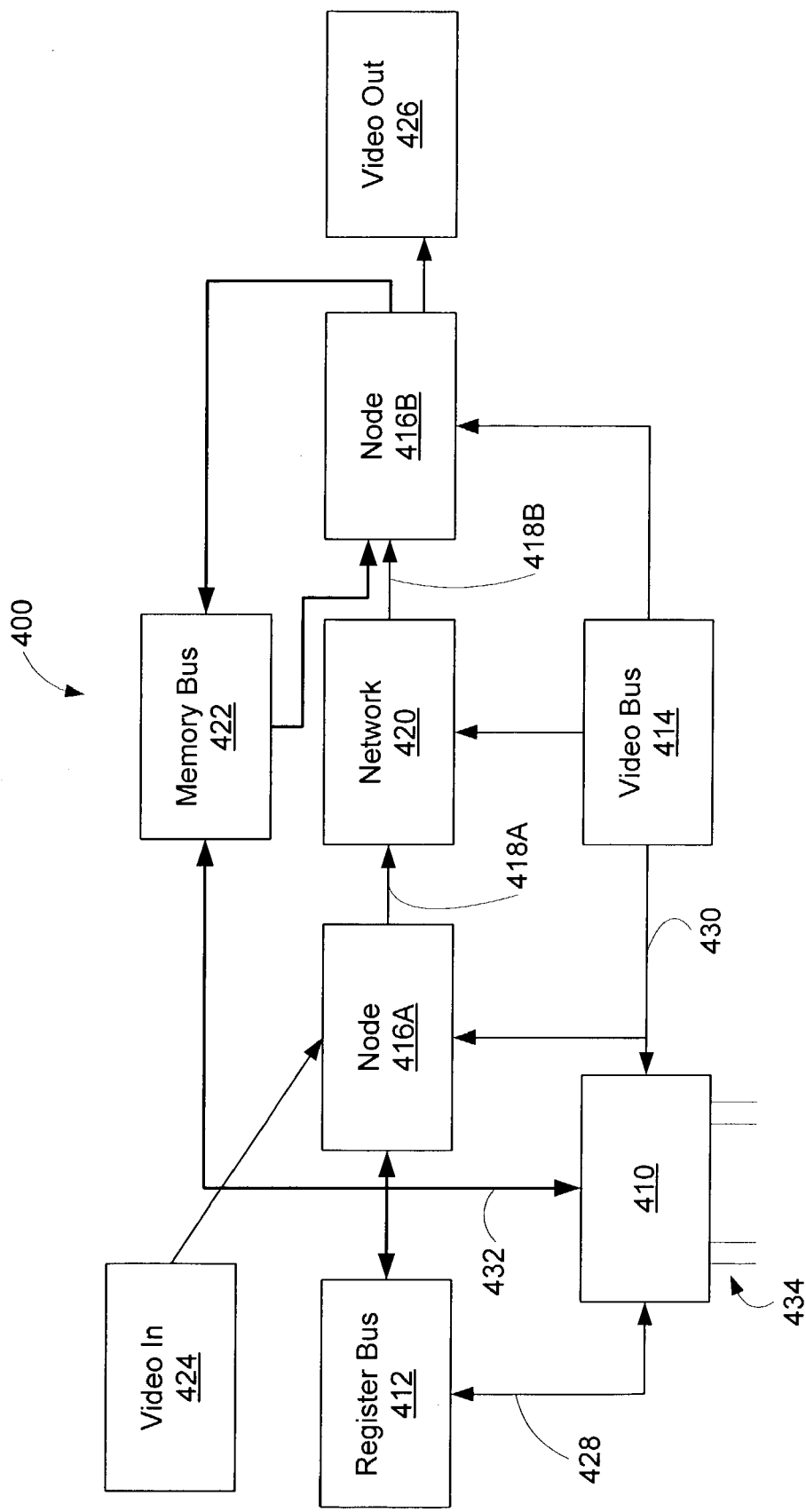
FIG. 4 illustrates one embodiment of a block diagram of a network environment including one or more links or busses for video processing modules busses in accordance with the present invention.

FIG. 4 illustrates one embodiment of a block diagram of a network environment (alternatively referred to as a "display engine") for video processing modules in accordance with the present invention. The network, generally designated 400, is adapted to support a pull data scheme and comprises at least a register DMA controller, one or more nodes, one or more links, and one or more network modules. In this embodiment, the register DMA controller 410 is responsible for register access within the system 400. The register DMA controller 410 connects the register bus 412 (alternatively referred to as "RBUS") with the video register bus 414 (alternatively referred to as "VBUS"). More detail about the network is provided in U.S. Provisional Application Ser. No. 60/420,151 filed Oct. 22, 2002, titled "Network Environment for Video Processing Modules" and U.S. patent application Ser. No. 10/314,525 filed Dec. 5, 2002, titled "Network Environment for Video Processing Modules", the complete subject matter of each of which is incorporated herein by reference.

The system 400, in one embodiment, further comprises one or more nodes 416 (two nodes 416A & 416B are illustrated). Nodes 416 are modules that process video information (nodes 416A & 416B are illustrated having video-in signals 414 and video-out signals 426 respectively). Some examples of nodes comprise video scalers, 2D graphics compositors, video encoders, etc.

FIG. 4 further illustrates one or more links, interfaces or busses 418 (two links 418A & 418B are illustrated). In this embodiment, the links 418 comprise a set of signals or busses that tie or connect at least two nodes or one node and one network module together (link 418A is illustrated coupling node 416A to network module 420 while link 418B is illustrated coupling network module 420 to node 416B). The links 418 are adapted to transfer information using a predefined protocol as provided below.

Additionally, system 400 comprises one or more network modules 420 that, in this embodiment, are specialized nodes that don't perform video processing functions. Rather, the network module 420 connects at least two or more links 418 together, routing information between them. In general, the system 400 may include a number of pipelines (i.e., display pipelines) formed by chaining multiple nodes together. Each display pipeline starts at one or more nodes 416, where it is contemplated that each node has a memory interface to a frame buffer (not shown in FIG. 4). Functions are added to the pipeline by cascading more nodes to the pipelines. Finally, a pipeline ends at one or more nodes, where each such node is a desired output channel.

In accordance with the present invention, the register bus or RBUS 412 is connected to the video register bus or VBUS 414 through the register DMA controller 410. In this embodiment, both busses use identical signaling and protocols. The register DMA controller 410 acts as a slave to the RBUS 412 and forwards all the transactions to VBUS 414. In addition, register DMA controller 410 may perform one or more Register DMA operations, which comprises decoupling a host from video timing by automating mode changes.

In one embodiment, register DMA controller 410 includes four interfaces coupled thereto. There are two register bus interfaces, one interface 428 coupling the register DMA controller 410 to RBUS 412 and the other interface 430 coupling the register DMA controller 410 to VBUS 414. The third interface is a memory bus interface 432 coupling the register DMA controller 410 to the memory bus 422 (alternatively referred to as "MBUS"). The memory bus 422 is used to access register writes from an external memory. Finally the last interface 434 comprises an array of signals coming from at least one of the nodes 416, which are used as DMA triggers.

In accordance with one embodiment, display modes or pipelines are configured or changed using control registers. Instead of updating the display modes one at a time, the host uses the register DMA controller, feature or operation (alternatively referred to as the register DMA controller in FIG. 4) to automate the process.

Figure 5:
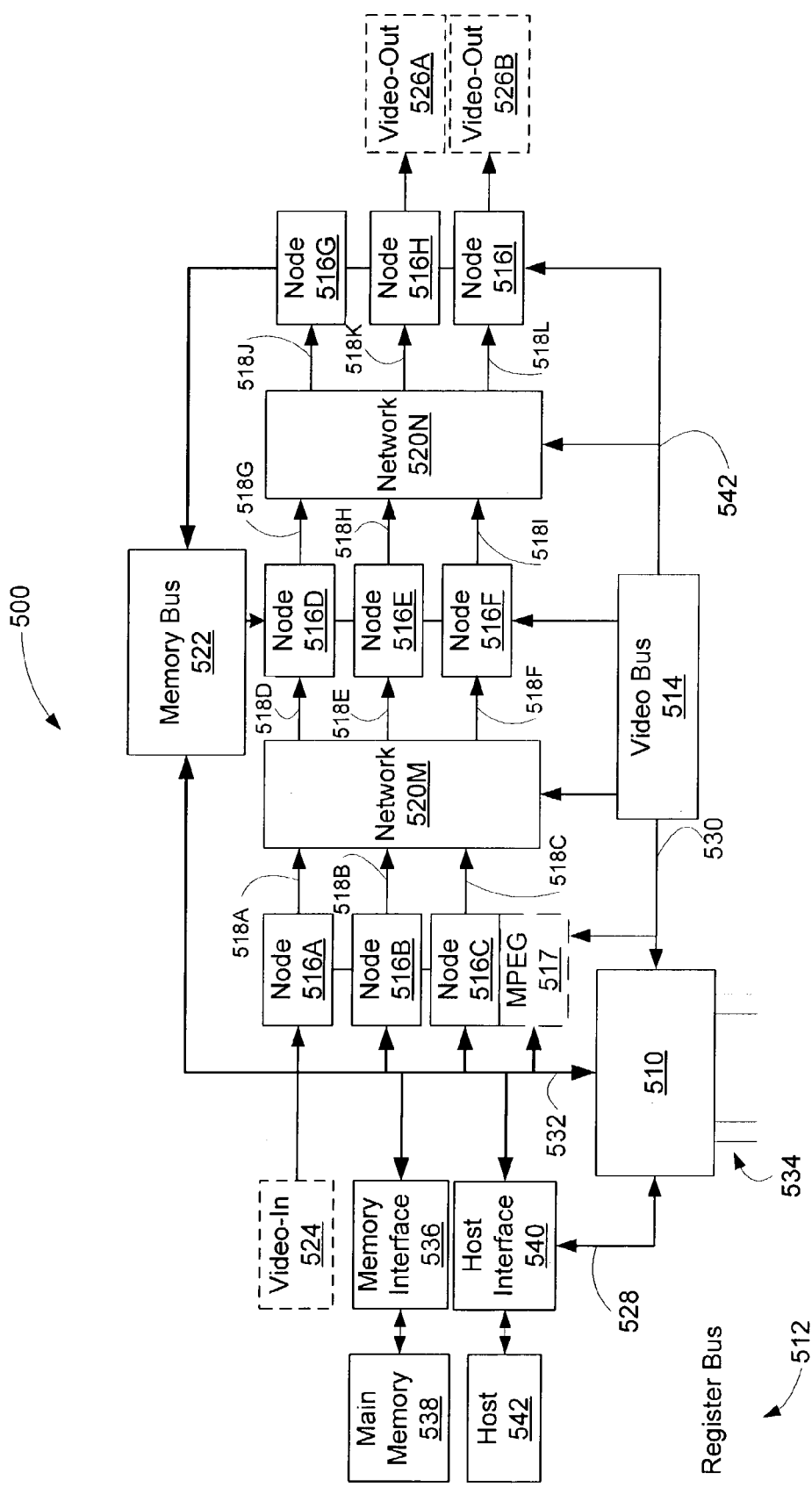
FIG. 5 illustrates another embodiment of a block diagram of a network environment including one or more links or busses in accordance with the present invention.

FIG. 5 illustrates another embodiment of a block diagram of a network or display engine according to the present invention. In this embodiment, the network, generally designated 500, is adapted to support a pull data scheme. Register DMA controller 510 is responsible for register accesses within the network 500. The register DMA controller 510 connects the register bus or RBUS 512 with the video register bus or VBUS 514.

In this embodiment, the RBUS 512 comprises at least one video-in module 524 coupled to and communicating with at least one node (Node 516A for example). Further the RBUS 512 may comprise a memory interface 536 coupled to and communicating with at least the memory bus 522 (using memory bus interface 532 for example) and main memory 538; and a host interface 540 communicating with at least the memory bus 522 (using memory bus interface 532 for example), host 542 and register DMA controller (using interface 528 for example).

The network 500, in this embodiment, comprises a plurality of nodes 516 (nine nodes 516A-516I are illustrated) adapted to process video information. While nine nodes are illustrated, more (or less) nodes are contemplated. Again, the nodes 516 process video information (node 516A is illustrated having video-in signals 524 communicating therewith, while nodes 516H and 516I are illustrated having video-out signals 526A and 526B respectively communicating therewith). In this embodiment an optional MPEG decoder 517 is illustrated coupled to node 516C, and communicating with video bus 514, register DMA controller 510 and memory bus 522.

FIG. 5 further illustrates a plurality of links, interfaces or busses 518 (12 links 518A-518L are illustrated). Again, while 12 links 518 are shown, a different number of links is contemplated. In this embodiment, the links 518 comprise a set of signals or busses that tie at least two nodes 516 together and transfer information using a predefined protocol as provided below.

Additionally, network 500 comprises a plurality of specialized nodes or network modules 520 that, in this embodiment, connect at least two or more links 518 together, routing information therebetween. It is again contemplated that, in general, the network 500 may include a number of display pipelines formed by chaining multiple nodes together using the network modules 520 to switch between the nodes 516, thus varying or changing the pipeline. Each pipeline starts and ends at one or more nodes 516, where it is contemplated that each node has a memory interface 536 to a frame buffer. Functions are added to the pipelines by cascading that pipeline with more nodes.

In accordance with the present invention, the RBUS 512 is connected to the VBUS 514 through the register DMA controller 510. In this embodiment, both busses use identical signaling and protocols. The register DMA controller 510 acts as a slave to the RBUS 512 and forwards all the transactions to VBUS 514. In addition, register DMA controller 510 is a Register DMA, decoupling the host from video timing using automating mode changes to configure at least one display pipeline from a plurality of possible display pipelines.

One embodiment of the present invention relates to a set of signals, buses, interfaces or links that tie or connect at least two video processing modules (for example, two nodes or at least one node and one network module) together forming one or more display pipelines as provided previously. The links are adapted to transfer information using a predefined protocol, enabling communication between the video modules. In this embodiment, the clock frequency of the link or bus may be defined based on the required throughput.

The bus or link (similar to the bus or links 418 and 518 provided previously) connects at least two modules in the network (e.g., at least one node and one network module forming sender and receiver modules) enabling communication there between. It is contemplated that optional flow control signals may be used, enabling the bus to be stalled. Further embodiments are contemplated in which the bus routes data from a single sender to multiple receiver modules. In this embodiment, it is contemplated that the slowest receiver module governs the flow control rates of such bus.

In accordance with the present invention, the bus or link may support at least basic and extended operation. Basic operation comprises the communication of pixel data on the link, while extended operation supports the communication of pixel data and one or more additional packets of data sent every field time. The additional packet of data may comprise frame level control or user parameters that a receiver module may use to correctly process the video. Such packets of data are transmitted or communicated prior to each field of data, providing mechanisms used by transmitting devices to setup control fields in the receiver module prior to frame processing. Transmitting such data removes the need to use custom sideband signals or the system CPU to synchronously communicate control parameters to all the video processing modules.

Basic operation of the bus or link contains data signals that transmit or communicate pixels, handshake control signals for flow control, and sideband signals to indicate color subcomponent, colorimetry, sync information, etc. In accordance with this operation, the bus does not communicate state information used to decode the contents of the bus on a per-cycle basis. All the information concerning the current pixel type, format, color space, etc. is communicated with every pixel, so that a basic receiver (i.e., requiring a simple state machine control for rate control hand shaking) may be used.

The extended operation of the bus or link includes communicating one or more additional packets of data along with the pixels or other data. Such additional packets of data may include formats for Control Address, Control Data, User Address and User Data (alternatively referred to as "control and user words"). These data formats may be used to send the packet of data at the beginning of a field or frame (i.e., prior to the StartField information). Sending the packet of data at the beginning of the field or frame enables updating field-specific information for each field, which may be used to control and configure a processing engine.

It is contemplated that control and user words may include (but are not limited to) such information as: time stamps; windowing and cropping pixel and sub-pixels; phase shift information; decode information such as pull-downs; repeat frame; progressive or interlaced source; pixel aspect ratio; filter controls for horizontal scaling; scaling modes; de-interlace control modes; etc. It is contemplated, in one embodiment, that the communication of extended data packets utilizes a complex, extended receiver (complex in comparison to the basic receiver used with a bus in basic operation) as the data is transmitted as a sequence of multiplexed address/data words. In one embodiment, the data packet contains 256 bytes for control data and 256 bytes for user data.

Embodiments of the bus or link adapted for extended operation may be used with a basic receiver module (i.e., a receiver module designed for use with a bus adapted for basic operation). The extended or additional information or data packet may be sent as a pixel format that the basic receiver may discard. In this manner, video pixel information may be communicated between the nodes regardless of the bus operation.

In one embodiment of the present invention, the bus or link is adapted to indicate all of the information that a receiver needs to process a video field of data. The bus is adapted to transmit active video pixels, without transmitting blanking pixels. In other words the bus does not communicate blank pixel information or frame-related timing information. The timing information is inserted in the last module in the network, prior to output. Hence, the bus is adapted to carry or transmit a data structure containing control and video (or data) information and provide synchronization between the control and video information.

In one embodiment, the bus or link transmits control or user packets followed by a field of video pixels. In this embodiment, the control and user packets are used to define how the field of video is processed. StartLine and StartField signals separate the data contents of the bus. These signals are coincident with the first byte of the first pixel in a field and in each line. The arrival time of these signals generally precedes the Vertical Sync and Horizontal Sync of a typical timing generator. It is contemplated that the arrival time of these signals preceding the Vertical Sync and Horizontal Sync is used as the bus pulls data as needed by the output device (i.e., supports a pull data flow), hence all pixel data must arrive prior to the necessary output time. The control packet is indicated using a specific format signal on the bus.

It is also contemplated that, in one embodiment, the bus enables the simultaneous transmission of multiple lines of video (two lines for example). Multiple lines of video are communicated with additional data signals for each line of pixels. In this embodiment, the multiple lines of pixels are sent clock-synchronous, sharing the same flow control handshaking, the same control signals on a beat-by-beat basis, and the same signals are used for StartLine, StartField, Colorimetry, ColorType, Format, and ColorSync. The multiple lines of data may contain the same number of pixels, and be confined to lines from the same field/frame point in time.

In this embodiment the bus is adapted to act as a synchronous link between the sender and receiver modules. The clock for both the sender and receiver modules is shared and synchronous for both modules. Furthermore, the bus clock is assumed to be synchronous with the data signals, while the pixel transfer rate is independent of the video-processing rate within the sender and receiver modules. In the event that the sender and receiver modules use different clocks, clock-domain-crossing techniques may be used to control handshaking, flow control and data buffering. It is also contemplated that the bus or link may be used in a network having processing rates equal to or greater than the transmit rates needed by the next module in a chain of video processors (i.e., display pipeline). Any resulting differences in the processing rate between modules may be controlled using flow-control handshaking on the bus.

Figure 6:
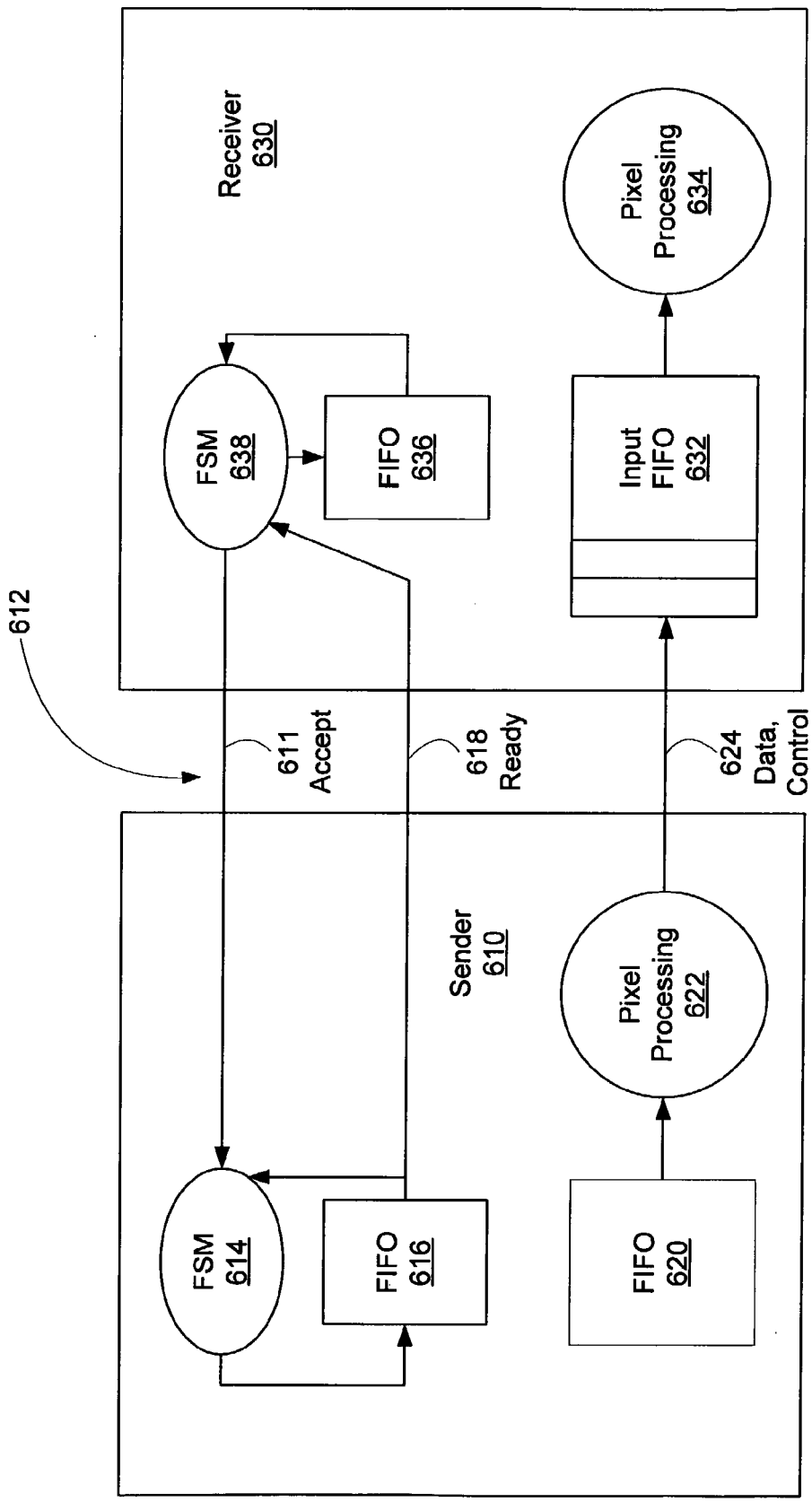
FIG. 6 illustrates one embodiment of a block diagram of a control model for a bus in accordance with one embodiment of the present invention.

FIG. 6 illustrates a block diagram of a control model for a link in accordance with one embodiment of the present invention. More specifically, FIG. 6 illustrates a control model for sender and receiver modules 610 and 630 communicating via a bus 612 in accordance with one embodiment of the present invention.

In this embodiment, the sender module 610 process pixels or other data as fast as possible, responding to the incoming accept signal 611 transmitted via bus 612 to stall pixel processing at the current cycle. In this illustrated embodiment, the sender module 610 comprises a finite state machine or FSM module 614 communicating with a first FIFO 616 in turn communicating with the receiver module 630 via one or more ready signals 618. The sender 610 also comprises a second FIFO 620 communicating with or coupled to a pixel processing module 622.

In the illustrated embodiment, receiver module 630 comprises a FIFO 636 communicating with an FSM module 638. The FSM module 638 communicates with the sender module 610 using a ready-accept protocol transmitted using bus 612 (i.e., a protocol using ready and accept signals 611 and 618). The receive module also comprise one or more input FIFOS 632 (a plurality of FIFOs 632 are illustrated) communicating with pixel processing module 634.

The receiver module 630 receives data and control information 624 transmitted or provided by the bus 612 until the input FIFO 632 is full. In the same cycle as the input FIFO 632 is full, the accept signal 611 is de-asserted. The accept signal 611 is functionally equivalent to a !FifoFull. It is contemplated that the FIFO may have a depth equal to any number of words. It one example, a FIFO having a depth of one or two words is utilized.

In this embodiment, a FIFO depth of one word creates a combinational path between its output being accepted and its input being accepted. Chaining a number of such FIFOS creates a long combinational path. When the delay along such paths approaches the clock frequency, the combinational path may be broken with the inclusion of a stage with a two-word FIFO.

Both the receiver and sender modules 630 and 610 respectively are capable of stalling the data flow. In one embodiment, the receiver module 630 controls the data flow by monitoring the state of its FIFO 632 versus its data processing needs. When required, receiver 630 shuts off the accept signal 611, preventing FIFO 632 from being overrun with data. This control enables upstream modules to be designed to send data as fast as possible (as long as the data is accepted) knowing that data overruns may be prevented.

The sender module 610 is capable of providing pixels at an equal or higher rate than the receiver modules 630 needs to consume pixels. This ensures that the input FIFO 632 is never starved for any significant period of time. Further, if there is sufficient processing speed in the system, combined with buffering in the display pipeline, the system may become intolerant to latency in memory fetches at an initial sender module. The flow control mechanism enables bursty processing, without any degradation of the system.

Figure 7:
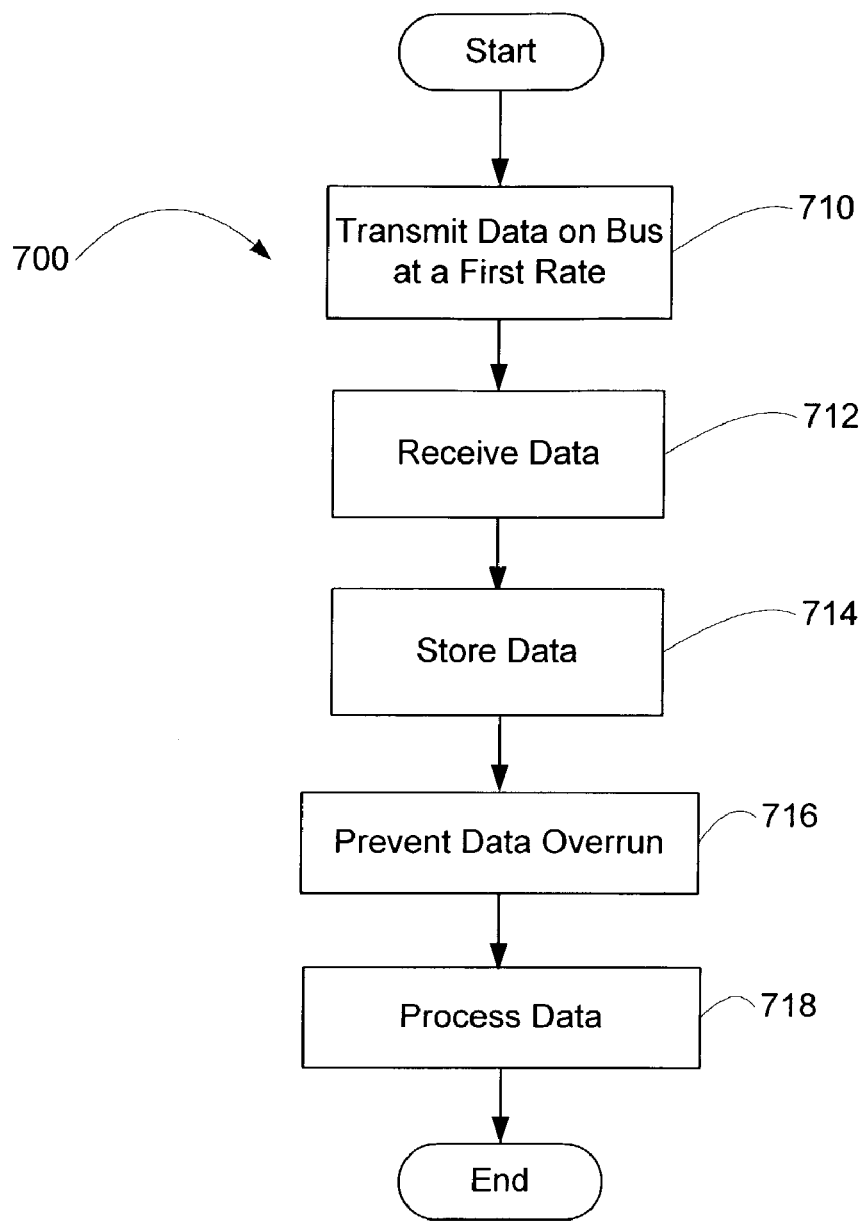
FIG. 7 illustrates one embodiment of high level flow diagram of a method of transmitting data over a bus in accordance with one embodiment of the present invention.

FIG. 7 illustrates one embodiment of a high level flow diagram for a method of transmitting data over a bus or link, generally designated 700, in accordance with one embodiment of the present invention. More specifically, the pixels or other data and the control information are transmitted over the bus, interface or link at a first rate as illustrated by block 710. A video processing module receives the data and control information as illustrated by block 712 and stores it in a storage module (an input FIFO for example) until the storage module is full as illustrated by block 714.

In one embodiment, the video processing module prevents data overflow or overruns as illustrated by block 716. More specifically, the video processing module controls the data flow by monitoring the state of its storage module versus its data processing needs. The video processing device then processes the data at a second rate as illustrated by block 718. In this embodiment, the first rate is greater or faster than the second rate (although it is contemplated that the second rate may be greater or faster than the first rate or both rates may be the same). The illustrated embodiment enables upstream modules in the display pipeline to send data as fast as possible (as long as the data is accepted) knowing that data overruns may be prevented.

Figure 8A:
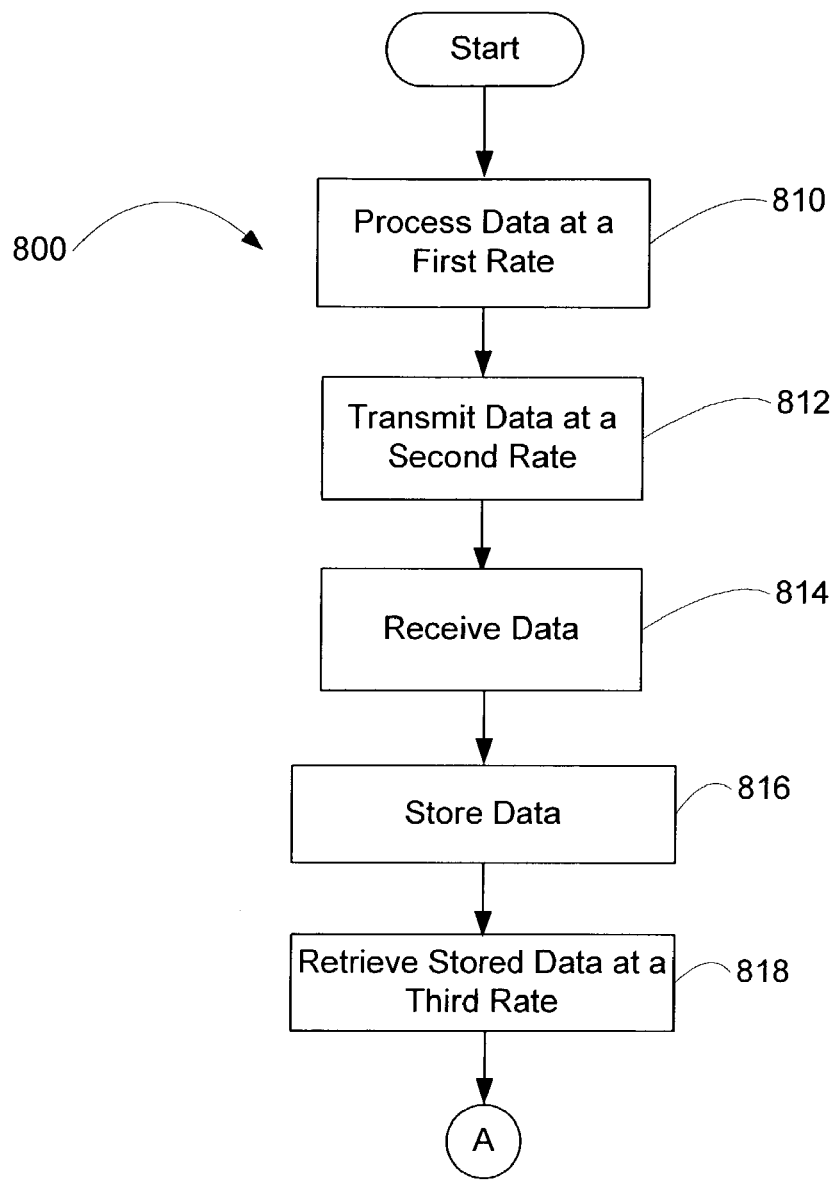
FIGS. 8A and 8B illustrate one embodiment of a flow diagram of a method of transmitting data over a bus in accordance with one embodiment of the present invention.
Figure 8B:
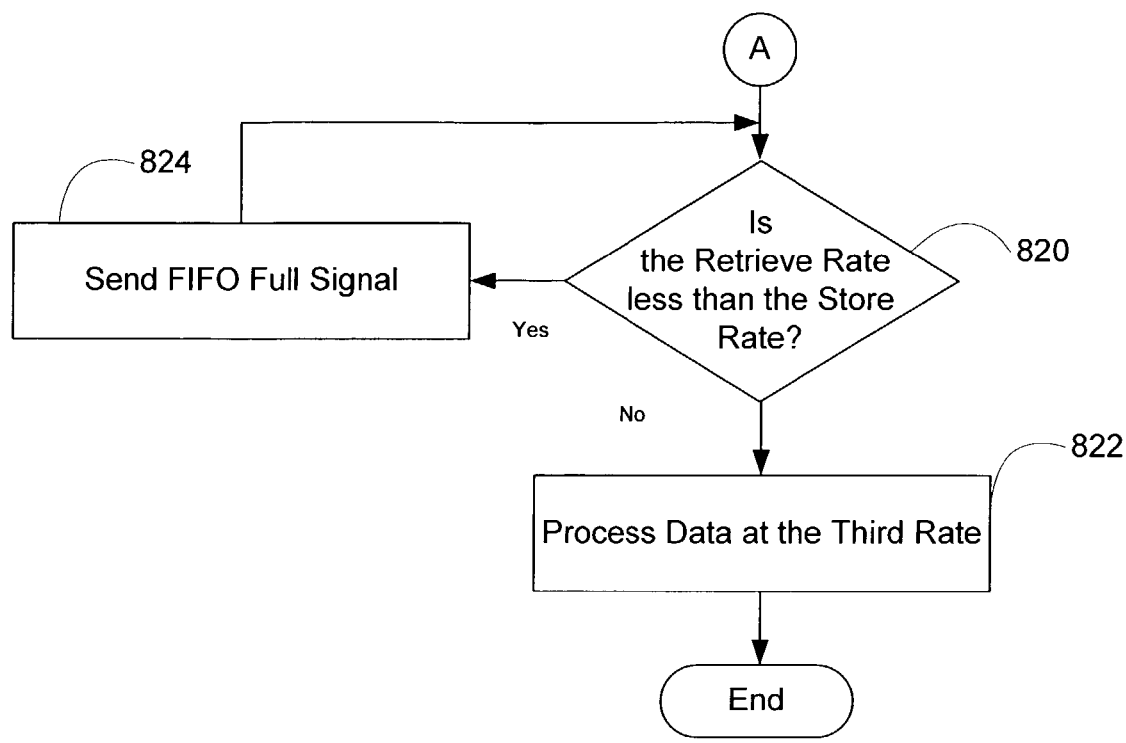

FIGS. 8A and 8B illustrate one embodiment of a flow chart for a method of transmitting data over a bus or link, generally designated 800, in accordance with one embodiment of the present invention. More specifically, a first video processing module (the sender module for example) processes pixels or other data at a first rate as illustrated by block 810. In this embodiment, the first video processing module process pixels or other data as fast as possible, responding to the incoming accept signal to stall pixel processing.

The pixels or other data and the control information are transmitted over the bus, interface or link at a second rate as illustrated by block 812. In one embodiment, the first and second rates are the same, although embodiments are contemplated in which the data is processed at one rate and transmitted at another. A second video processing module (the receiver module for example) receives the data and control information, and stores at least the data in a storage module (an input FIFO for example) until the storage module is full as illustrated by blocks 814 and 816 respectively.

The second video processing module retrieves the pixels or data from the storage module at a third rate as illustrated by block 818. In one embodiment, the second video processing module controls the data flow by monitoring the state of its storage module versus its data processing needs. In other words, the second video processing module determines if the rate the data is retrieved from the storage module is less than the rate at which the data is stored as illustrated by diamond 820. If the retrieval rate is less than the storage rate, the storage device may overrun, and the second video processing module sends a FIFO Full signal (deasserting the accept signal for example) as illustrated by block 824. This enables the second video processing module from being overrun with data.

The second video processing device process the data at a third rate (which in one embodiment is less than the first and second rates, although other embodiments are contemplated) as illustrated by block 822. Processing the data at the third rate, which in this embodiment is less than the first and second, ensures that the storage module is never starved for data for any significant period of time. This method may be performed only once, for a predetermined number of times or repeated as long as data is transmitted.

It is contemplated that the bus contains information that may be used to delineate the start of a line of video information, and the start of a field or frame of video information. The StartLine information on the bus is active only during the first beat of the first pixel of a line. The StartField information on the bus indicates the start of a field/frame, or the end of a field or frame. This signal is active only during the first beat of the first pixel of the first line of a field or frame or the first beat of the last pixel of the last line of the field or frame (i.e., end frame). It is contemplated that in this embodiment, unlike other video standards such as Rec656, the StartLine and StartField information is not separated by blanking lines or blanking pixels. All blanking information is removed from the data structure of the bus or link.

Essentially, the field of data is sent as a contiguous array of data on the bus, without blank pixels. This removes the strict timing relationship between the arrival time of the StartField on the bus, and the Vertical Sync information defined by NTSC or SMPTE standards. The output module inserts the correct timing information which governs the pull-rate of the data flow across the bus. Further, all modules supply pixel data to the output module at or ahead of the time the pixels are needed. This is governed by the flow control ready/accept signals (i.e., ready-accept protocol).

Known MPEG standards define Top fields and Bottom fields to be vertically adjacent, with Top field located above Bottom field. The fields may or may not be at different sample points in time (depending on progressive or interlaced encoded pictures). The display order of the fields is defined in the syntax for every MPEG picture to be either Top field first, or Bottom field first. These syntax bits are equivalent to the definition of field polarity in Rec-656 such that Top field=Field 1 and Bottom field=Field 2.

It is contemplated that the bus defines interlaced fields and progressive frames. These fields and frames relate to the type of data sent or transmitted on the bus, and may not be related to the source information. It is up to the feeder configuration to determine if it is necessary to send the video data in an interlaced or progressive format on the bus. For example, while MPEG-2 allows progressive frame encoding, the commonly used output format is interlaced video. If the video processing is intended to be field based data, then video bus is signaled with StartField='001' or '010' top or bottom field. (Not '011' progressive frame). Other restrictions on the bus usage relate to field types. StartField='001' is field 1, commonly called the Top field in the MPEG-2 standard. The lines of the Top field are located vertically above StartField='010' the Bottom field—field 2.

One embodiment of the bus is adapted to support three implementation widths, optimizing bandwidth vs. bus size, although other widths are contemplated. In this embodiment, the bus supports 8, 16, and 32 bits of pixel data. This enables all bus widths to carry any format of pixel data. For example, ARGB (32 bit per pixel) data may be sent across a bus of 8, 16, or 32-bit width. Additionally, as an example, 4:2:2 CbYCr video may be communicated over the same bus, simply by indicating a different pixel type and ColorType, even though the native size of the 4:2:2 CbYCr pixel is different from the ARGB pixel. Different flavors of RGB such as RGB 565 may be extended in the sender module to RGB 888 prior to transmission on the bus. The sender module may support a minimum of two modes of up-converting from various RGB quantization modes to RGB888. The two modes are Zero insertion, or replication of MSB bits. Other modes may be utilized as the specification of the device demands.

It is contemplated that, in one embodiment, the bus enables a receiver module to receive multiple types of data across the same bus, regardless of the data type or bus width. This enables using simple bus register DMA controllers allowing for bus width changes or data type changes. Narrow busses may require multiple clock beats per pixel to transmit all the color sub-components. Wider busses may send the entire pixel in one clock beat.

The flexible nature of the bus signaling enables a receiver module to receive and process different types of data, regardless of the bus width. A module coupled to the bus need only support a single specific bus width, ColorType and Format. The module does not need to support all ColorType, Format and bus width combinations. If a module is later reused and needs to support other formats or bus widths, simple bus register DMA controllers may be used to convert between different ColorType, Format and bus widths easily.

It is contemplated that, in an exemplary operation of the bus, (and any larger network or system of which the bus is incorporated into) comprises the source modules provide data at a rate equal to or faster than the rate needed by receiving modules. It is contemplated that, if a source module fails and stalls, all the downstream modules (downstream modules in a display pipeline for example) may stall, resulting in an eventual corruption of video on the display. The source modules may produce regular fields of data, regardless of their input or controls. For example, a display feeder either presents blank fields or MPEG fields on a repeating basis if the MPEG decoder is stopped, stalled, or waiting for a PTS. A memory playback module may present the last good field stored to memory if it is used as a sync-slip buffer. A memory playback module that is generating VBI data may output black VBI lines of data in the event that it has no more information in the display buffer in memory. A VDEC unit may output black fields if it loses sync to the input video source. The impact of a module failure or module stopping may affect all downstream modules.

Similarly, such exemplary operation of the bus comprises preventing the receiving module from going into a stalled state, specifically where the receiver module permanently stalls. For example, if a memory capture unit is connected to a Video Encoder, and the capture unit stops operating, the Video Encoder will eventually be starved of data. To prevent this, in one embodiment a video capture module may move video data to memory.

Figure 9A:
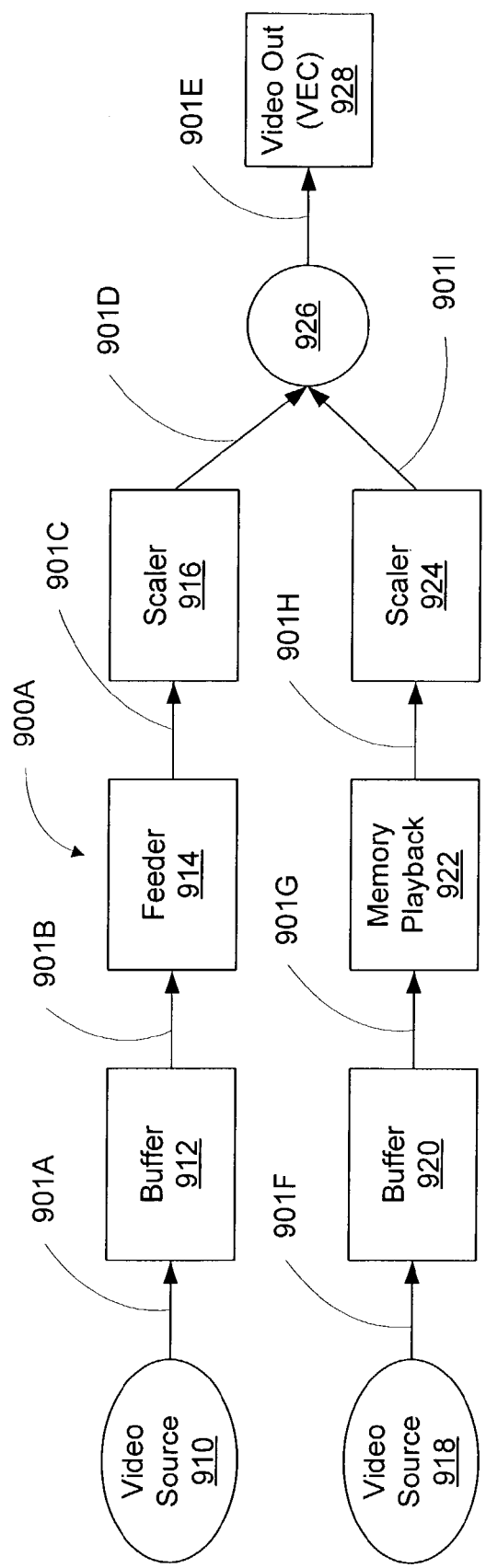
FIGS. 9A, 9B and 9C illustrate embodiments of data flow over a bus in accordance with one embodiment of the present invention.
Figure 9B:
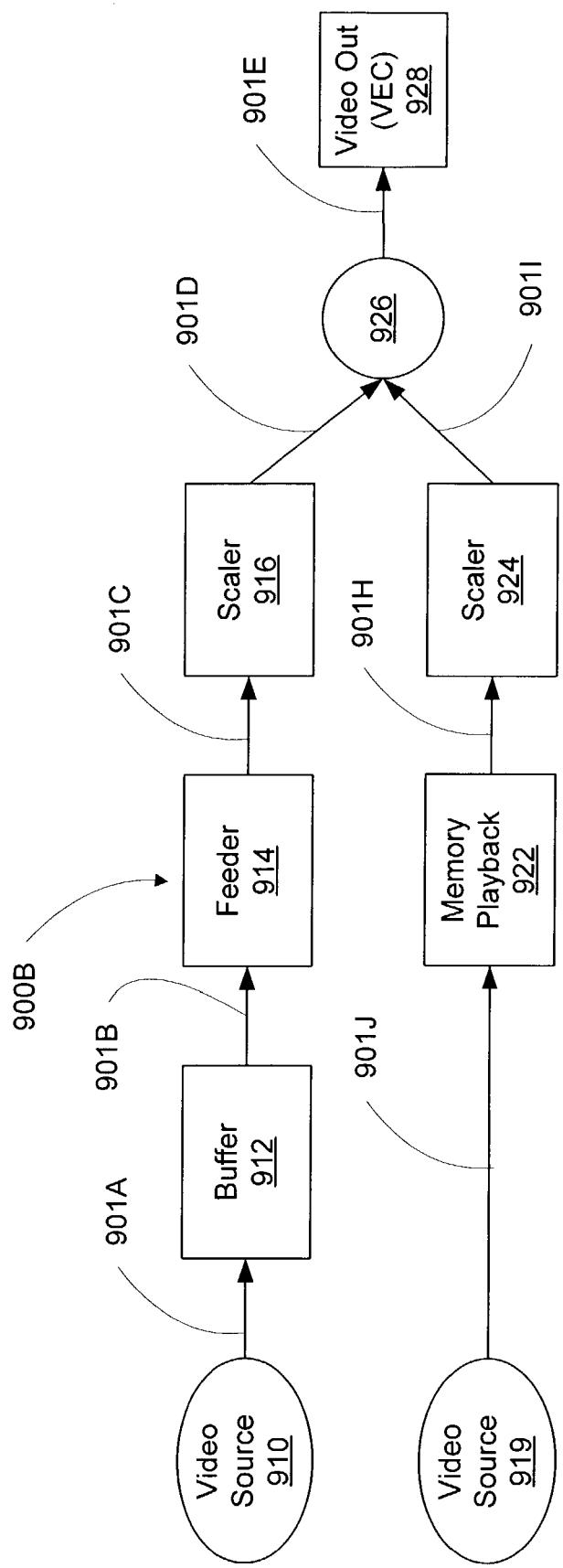
Figure 9C:
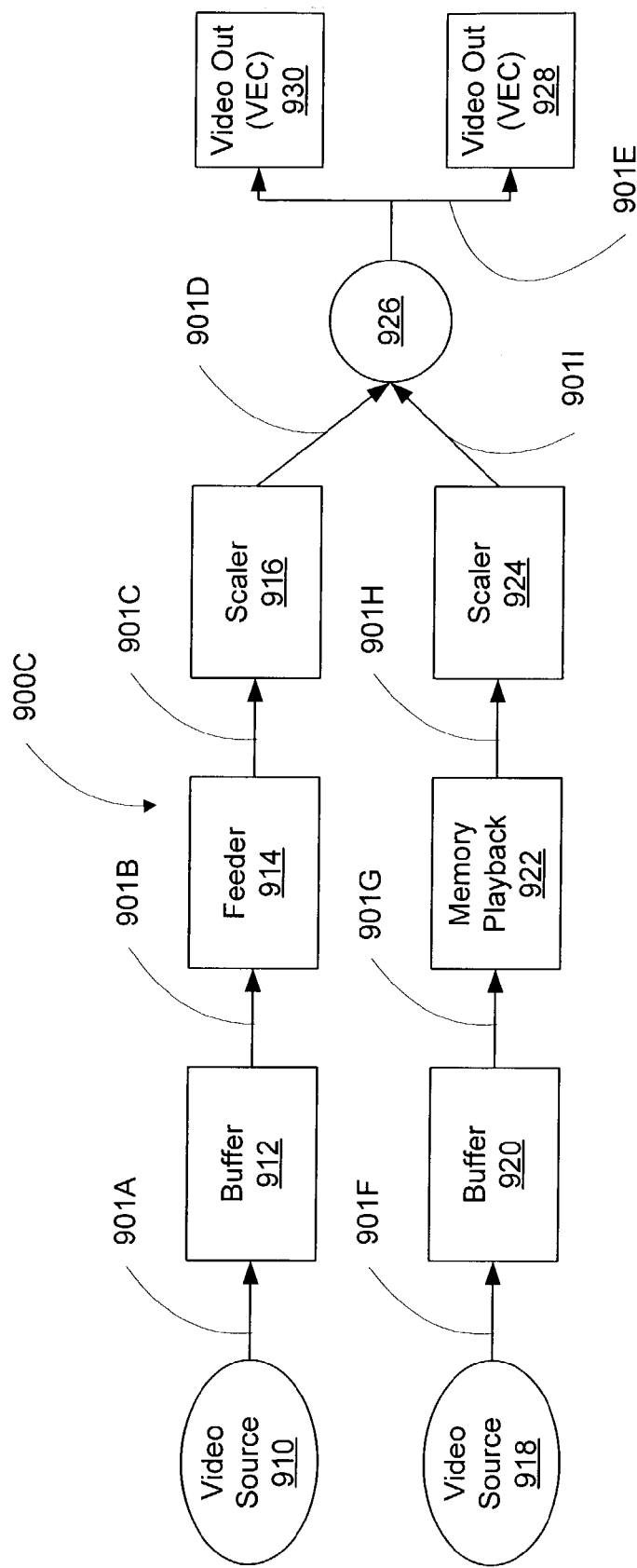

In accordance with one embodiment of the invention, all of the video sources in a video processing system may have some capability to implement buffers (sync-slip buffers for example), specifically in multi-source implementations. FIGS. 9A, 9B and 9C illustrates some implications of different delivery rates and how such delivery rates may impact the flow-control system of a bus.

FIG. 9A illustrates one example of data flow, generally designated 900A, over or through one or more busses or links 901A-I, in which the video output module 928 pulls data from the compositor 926, which in turn pulls data from two video sources (910 and 928) on demand (i.e., a pull data flow). In this example, the data rate is controlled by the VEC 928. The compositor 926 pulls data in advance of when the VEC 928 needs the data, forcing the feeder 916 and memory playback modules 922 (coupled to scalers 916 and 924 respectively) to pull the data from a double-buffers 912 and 920 at the same rate that the VEC 928 demands the data.

If either video source 910 and 918 is slower than the VEC 928, the sync-slip buffer (buffers 912 and 920) may occasionally repeat a field or a frame of data. If either video source is faster than the VEC 928, the sync-slip buffer 912 and 920 enable that source to overwrite a field or frame of data prior to data output (i.e., the resulting video will show a skipped frame or field). Exemplary embodiments of the Feeder and Memory playback modules 914 and 922 contemplate that they pull data from a double buffer on demand, which requires the hardware to skip or repeat frames as necessary to match the rate demanded by the VEC 928.

This example illustrated in FIG. 9A enables the VEC 928 to be clocked from any source. If it is clocked from a source synchronous to a video source, then that source may never see a sync-slip artifact on the display. If the VEC 928 is not clocked synchronous to a video source, then that source may see sync-slip artifacts on the display.

FIG. 9B illustrates another example of data flow, generally designated 900B, over one or more busses or links 901A-E and 901H-J. In this example, the data flow rate over or through the bus is not dictated by the demand-pull of the VEC 928, but rather by both the fixed-rate source 919 and the VEC 1228. If the VEC 928 demand is slightly ahead or greater than the demand of the fixed-rate source 919, pixels are not supplied as needed and the VEC 1228 may output black pixels, causing artifacts on the display. If the VEC 1228 demand is slightly behind or less than the demand of the fixed-rate source 1218, the compositor 1226 stalls the fixed rate source 919 until the VEC 1228 accepts the pixels. In this situation, the fixed rate Source 919 has no place to place or store the pixels, which are likely dropped. Both situations may lead to artifacts on the display.

It is contemplated that, if both the VEC and fixed rate source were synchronized (having locked clocking), a small amount of buffering may be used to prevent such artifacts from being displayed on the display. It is also contemplated that, in this example, the video source 910 would not clock the VEC output. Rather, this source 9210 would be treated as a sync slave.

FIG. 9C illustrates still another example of data flow, generally designated 900C, over or through one or more links 901A-901I. This example illustrates multiple Sync-Slip buffers 910 and 918 on the inputs, which may solve the synchronization problems provide previously, but with dual outputs modules 930 and 928. This example may experience problems maintaining proper video rate control on the output. Typically, the compositor 926 outputs pixels at the rate matching the slowest output device (i.e. a distributor block may send pixels to two outputs, but may not send an accept signal to the compositor 926 until both output modules have accepted the pixel). This results in the faster output module running out of pixels to display, outputting black pixels and other artifacts on the display.

If both output devices 930 and 928 are synchronized and running off the same clock, with the same frame rate output, a small amount of buffering may be used to prevent such artifacts from being displayed on the display. There may be initialization artifacts (i.e., due to the startup time) and Vertical Sync timebase of both devices may be different. The modules may slip the Vsync output timing to match the input arrival time, or they need to be co-designed to share the same sync timing generator.

Figure 10:
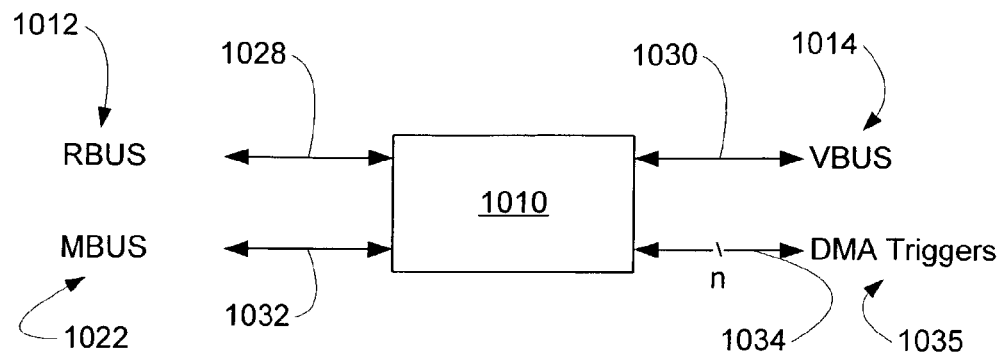
FIG. 10 illustrates one embodiment of a register DMA controller in accordance with one embodiment of the present invention.

FIG. 10 illustrates one embodiment of a block diagram of a register DMA controller 1010 including four interfaces similar to that provided previously. There are two register bus interfaces, one interface 1028 coupling the register DMA controller 1010 to RBUS 1012 and the other interface 1030 coupling the register DMA controller 1010 to VBUS 1014. The third interface is a memory bus interface 1032 coupling the register DMA controller 1010 to the memory bus 1022. Finally, interface 1034 comprises an array of signals (0-n) coupled to at least one of the nodes 1016, which are used as DMA triggers, and generally designated 1035. More detail about the register DMA controller is provided in U.S. patent application Ser. No. 60/420,140 filed Oct. 22, 2002, titled "Hardware Assisted Format Change Mechanism in a Display Controller", the complete subject matter of which is incorporated herein by reference.

Figure 11:
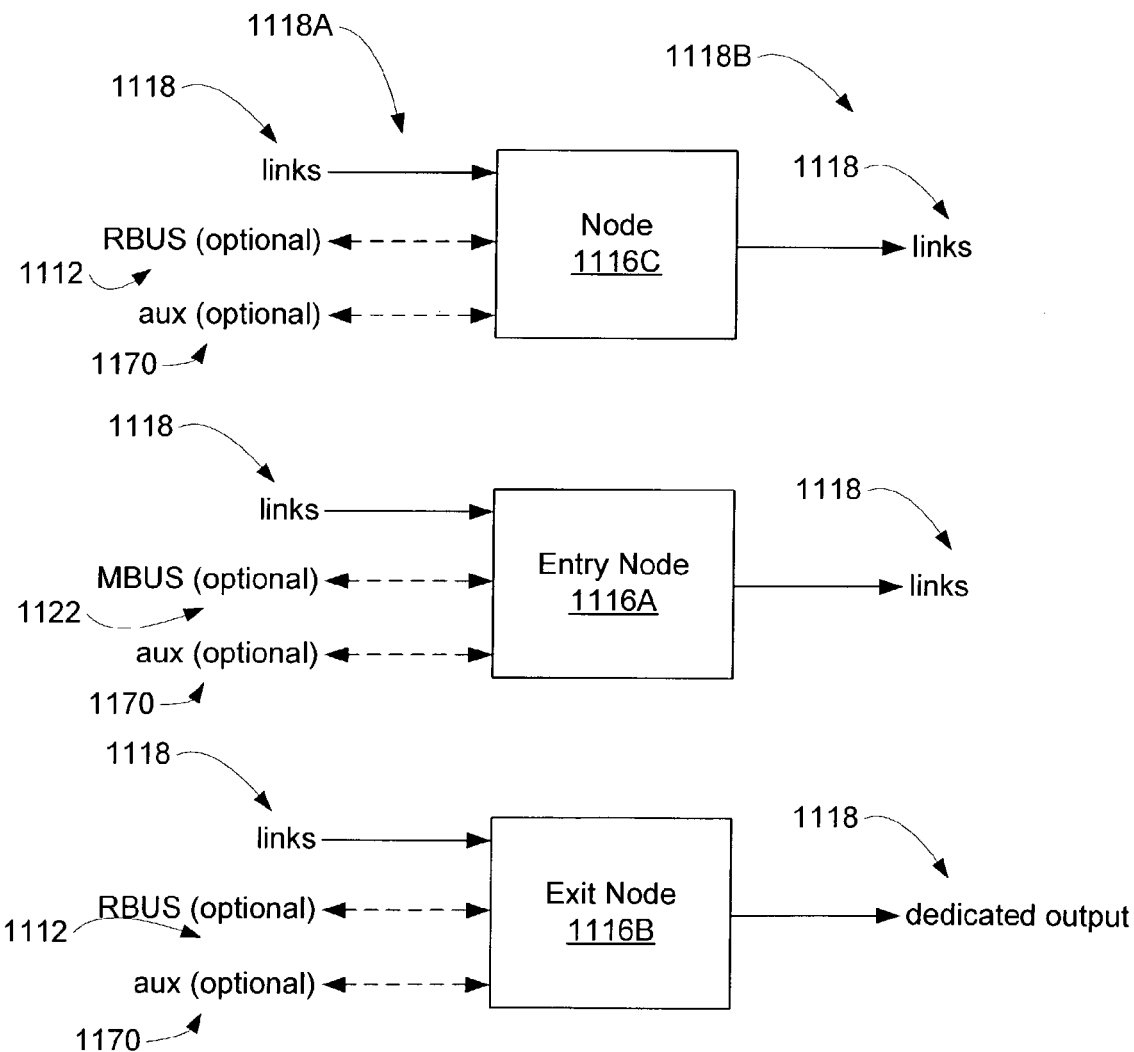
FIG. 11 illustrates embodiments of block diagrams of nodes in accordance with the present invention.

FIG. 11 illustrates different embodiments of the nodes, generally designated 1116, used in one embodiment of the network. The network, in accordance with the present invention, is adapted to perform video processing functions similar to a display engine, including video playback, scaling, encoding, etc. It is contemplated that each node 1116 in the network may be generally divided into three categories according to its position in a display pipeline: entry, exit, and intermediate. Video data enters a display pipeline at an "entry node" designated 1116A and leaves at an "exit node" designated 1116B. All the nodes in-between are referred to as "intermediate nodes" or "nodes" designated 1116C. Examples of entry nodes 1116A include MPEG display feeders, playback engines, etc. Examples of exit nodes 1116B include video encoders, capture engines, etc. Examples of intermediate nodes 1116C include scalers, compositors, etc. It is further contemplated that the position of each node in the pipeline configuration is not fixed; rather its position varies depending on the display pipeline (i.e., an entry node in one pipeline may be an intermediate node in another display pipeline).

As illustrated, the nodes 1116 each generally include at least one input and output interface, bus or link 1118 coupled thereto and communicating therewith. It is contemplated however that each node 1116 is adapted to have multiple input or output links 1118A & 1118B coupled thereto and communicating therewith (a compositor for example has multiple input links). Furthermore, each node 1116 may also have an optional RBUS 1114, MBUS 1122 or some other optional auxiliary interface 1170 (a DMA trigger for the register DMA controller for example) communicating therewith. If the node 1116 is an entry node 1116A, it is contemplated that the input link is an MBUS interface 1122 as illustrated. For exit nodes 1116B, the output is replaced by a dedicated output 1150 (e.g., a memory interface for a capture engine or an analog video output for a video encoder).

As provided previously, a display pipeline in the network starts or begins at one or more entry nodes 1116A. The entry node 1116A is responsible for feeding video to the downstream nodes 1116 and includes, for example, MPEG display feeders and playback engines. In one embodiment, the input to an entry node 1116A may comprise RBUS and memory interfaces. Its output may comprise one or more output links 1118B. In addition, the entry node 1116A may include one or more auxiliary interfaces 1170 such as a DMA trigger for the register DMA controller.

The intermediate node 1116C, in one embodiment, may have specific functions comprising scaling, compositing, etc. One or more nodes are added to a display pipeline as its features are used to satisfy certain output requirements. In general, the input and output of an intermediate node 1116C comprises one or more links 1118A & 1118B as provided previously. In addition, the intermediate node 1116C may have an optional register bus interface or some other auxiliary interface 1170 coupled thereto and communicating therewith.

As provided previously, the display pipeline ends at exit node 1116B, which may comprise a video interface such as a composite signal encoder or capture engine for example. In general, the inputs to an exit node 1116B consist of an input link 1118, an optional register bus 1112, and a video output or a memory bus interface 1170.

In addition to the functions described previously, the exit nodes 1116B may include some debugging functions. For example, a checkpoint register may be written into control packets and read by the register bus 1112. This register is programmed in every field to a field dependent number. At the same time, a host may check the progress of the video packets by monitoring this register through the register bus 1112.

It is contemplated that exemplary nodes 1116 process and output packets in their arriving order. If the node is a multi-input node, it may only operate on packets corresponding to the same field in time. For example, if the node 1116 is a graphics compositor, the i-th field of one input may be combined with the i-th field of another input. If the active input is not receiving any data, other inputs and the outputs may be stalled.

If the exemplary node 1116 is a multi-output node, control and video packets may be forwarded to all the output links. Stalling by one of the output links stalls the inputs as well as the other outputs. Unused input or output links of such exemplary nodes 1116 may be disabled using RBUS 1112 and the control register. The disabled link may be excluded from controlling other inputs or outputs. For a pipelined node, the next field's control packet should not have any effect on current field's video packet.

Figure 12:
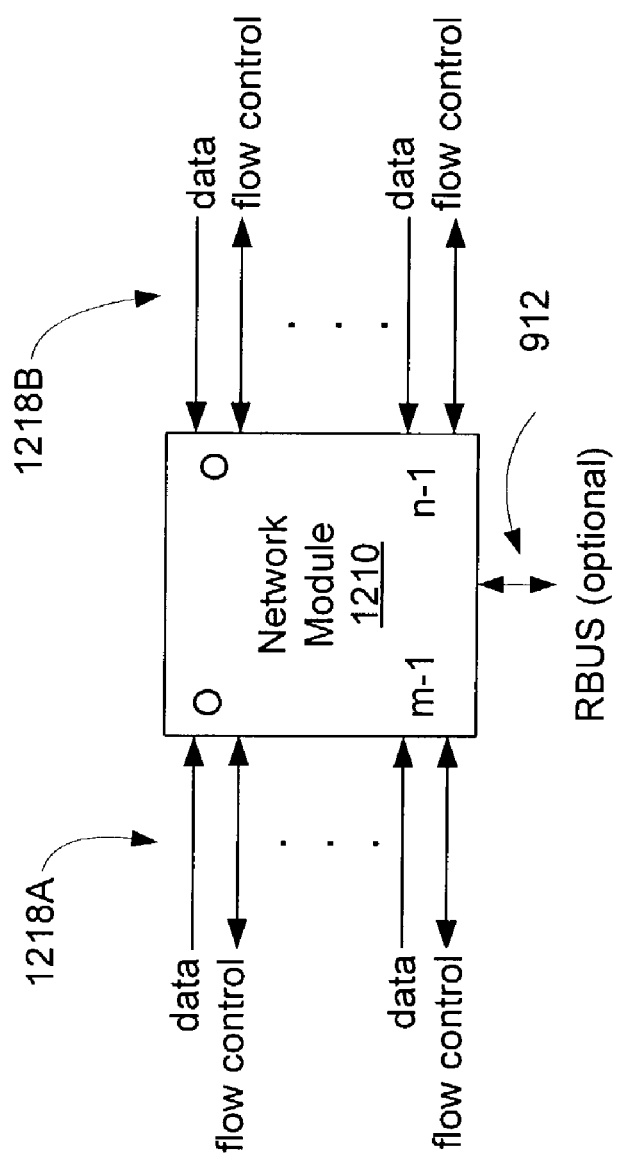
FIG. 12 illustrates one embodiment of a network module in accordance with one embodiment of the present invention.

FIG. 12 illustrates one embodiment of a network module 1220 in accordance with the present invention. In this embodiment, the network module 1220 comprises a plurality of network interfaces, busses or links generally designated 1218 and switches, described in greater detail below. In this invention, one or more network modules are used to connect one or more nodes, forming at least one display pipeline from a plurality of possible display pipelines. Since the nodes may be re-configured, it is contemplated that display pipelines having different functionality may be implemented for different applications. In other words, the display pipelines are dynamic and not static.

The network interfaces or links 1218, in this embodiment, comprise input and output links 1218A & 1218B respectively, and an optional register bus 1212. In this embodiment, m input links 1218A and n output links 1218B are illustrated, where m and n may be the same or different. It is contemplated that m may be greater than, equal to or less than n (i.e., the number of input links 1218A may be greater than, equal to or less than the number of output links 1218B).

It is contemplated that different types of network modules may be used within the register DMA controller or display engine. The network module 1220, in accordance with the present invention, is comprised of an array of switches coupled together using predefined topology. This topology determines the network module's routing capabilities, as well as the implementation cost.

Many modifications and variations of the present invention are possible in light of the above teachings. Thus, it is to be understood that, within the scope of the appended claims, the invention may be practiced otherwise than as described hereinabove.

The invention claimed is:

1. A bus adapted to transmit pixel data and control information to at least one processing module and provide synchronization between the pixel data and the control information without requiring the transmission of blank pixels or timing information, wherein the bus is adapted to transmit pixel data processed by the processing module from the processing module at a rate independent of a processing rate of the pixel data by the processing module to another processing module;
- wherein the bus is adapted to transmit the pixel data in accordance with a protocol to prevent pixel data overrun in the processing module, wherein said protocol comprises transmitting accept and reject signals;
- wherein the data is transmitted to the another processing module at a rate faster than processed by the another processing module; and
- wherein the bus is adapted to transmit pixel data and at least one additional packet of data every field time.

2. The bus of claim 1, wherein the processing module uses the pixel data and control information to process a field of data.

3. The bus of claim 1, wherein said at least one additional packet of data comprises indicators indicating the beginning data byte for each line.

4. The bus of claim 1, wherein said pixel data is stored in a storage element in the processing module prior to processing.

5. The bus of claim 1 adapted to provide pixel data to at least two video processing modules.

6. The bus of claim 1 adapted to enable simultaneous transmission of multiple lines of video.

7. The bus of claim 6, wherein additional data is communicated with each said line of video.

8. The bus of claim 1 adapted to support more than one implementation width.

9. The bus of claim 8 further adapted to support implementation widths of 8, 16 and 32 bits of pixel data.

10. The bus of claim 1 adapted to provide multiple types of pixel data to the processing module.

11. The bus of claim 1, wherein the bus is adapted to transmit data from the processing module to the another processing module during assertion of the an accept signal from the another processing module, wherein the bus is adapted to stop transmitting data from the processing module to the another processing module during deassertion of the accept signal from the another processing module, wherein the accept signal is deasserted upon detection of a condition indicating that a data overrun is likely to occur.

12. The bus of claim 1, wherein the pixel data is transmitted as a contiguous array of pixel data comprising a two or more lines of pixel data.

13. The bus of claim 1, wherein said at least one additional packet of data comprises user data.

* * * * *